US005329119A

United States Patent [19]

Swartz et al.

[11] Patent Number: 5,329,119

[45] Date of Patent: Jul. 12, 1994

[54] ROTARY SWITCH ACTUATOR FOR DETECTING THE PRESENCE OF A SHEET OR THE LIKE WITH A HUB MEMBER HAVING INCLINED SURFACE SEGMENTS

[75] Inventors: Craig R. Swartz, Webster; Raymond P. Mileski, Fairport; John L. Havranek, Williamson, all of N.Y.

[73] Assignee: Xerox Corporation, Stamford, Conn.

[21] Appl. No.: 51,712

[22] Filed: Apr. 23, 1993

[51] Int. Cl.[5] .................... G01D 5/34

[52] U.S. Cl. .................... 250/229; 200/38 R

[58] Field of Search .............. 250/229, 231.13, 231.17, 250/232, 233; 200/38 R, 35 R, 80 R, 6 B, 6 BA, 564–569, 533, 537, 529; 74/10.29, 10.33, 22 A, 54–56, 437–441

[56] References Cited

U.S. PATENT DOCUMENTS 4,695,683 9/1987 Wingler et al. .................. 200/38 R 5,042,790 8/1991 Miller et al. .................... 271/110

5,063,364 11/1991 Tsoi ............................ 200/568

*Primary Examiner*—David C. Nelms

*Assistant Examiner*—Que T. Le

[57] ABSTRACT

An improved sheet detecting rotary switch activator is disclosed. The switch is modified by mounting the switch for rotation at a hub member which pivots about a fixed point. The hub member has teeth with a helical surface which mate with fixed surfaces having helical top surfaces. When the switch is rotated from a first position by passage of a paper sheet, energy is stored in the spring connected to the hub member. Upon release of the spring, energy by movement of the paper path switch contact arm moves the hub member from a position where the mating helical surfaces overlying are in contact to the output contact position. The return is a "soft" stop due to the dissipation of the release force of the spring in a direction generally normal to the helical surfaces of the mating teeth.

4 Claims, 3 Drawing Sheets

ROTARY SWITCH ACTUATOR FOR DETECTING THE PRESENCE OF A SHEET OR THE LIKE WITH A HUB MEMBER HAVING INCLINED SURFACE SEGMENTS

BACKGROUND OF THE INVENTION AND MATERIAL DISCLOSURE STATEMENT

The present invention relates to a rotary switch actuator and, more particularly to an actuator whose construction and operation has been modified to reduce the "bounce back" phenomena after the switch has been activated and released.

Mechanical/electrical rotary switches are well known in the art and have been used for a great variety of purposes. One function is to provide an electrical signal upon detecting the passage of an object such as a sheet of paper moving along a transport path. U.S. Pat. No. 5,042,790 discloses the use of a switch actuator which is positioned in a sheet transport path. The switch of the present invention can find utility in a sheet transport system of the type disclosed in this patent, whose contents are hereby incorporated by reference.

FIG. 1 illustrates a conventional prior art switch. A description of the switch and its operation is provided to identify and describe the cause of the "bounce back" phenomena which constitutes a problem for usage of this type of prior art switch. As shown in FIG. 1, the switch consists of a base substrate 2, which may be of a lightweight plastic construction, to which are mounted a horseshoe sensor 4 and a rotary switch assembly 6. Sensor 4 has a bifurcated or horseshoe configuration to establish upper and lower legs 8, 10, respectively. Upper leg 8 supports a light source such as a light emitting diode (LED) 12, where the lower leg 10 supports a light detector such as a photodiode 14. The diodes 12, 14 are aligned on a common sensing axis 16. Conventional wiring circuitry (not shown) supplies power to the LED 12 along connection 18, while output signals from photodiode 14 are sent to a system control circuit along connection 20. Switch 6, which may be made from a one piece molded plastic, comprises a hub 22 which is seated on a metal pivot post 24. Post 24 is rigidly connected to substrate 2. A curled hook segment 26 forms an extension of the hub and is used as the connection for one end of biasing spring 28. The other end of spring 28 is connected to a protrusion 30 which extends vertically upward from substrate 2. Switch 6 further comprises two arms 32, 34. Arm 32 is an arcuate shape and terminates in a tip 33 which projects an inclined edge surface 35 into the path of a paper sheet 36, moving in the direction of arrow 37. Arm 34 is generally oriented in the opposite direction and is positioned in its non-operative state so that the tip of arm 34 lies within the common sensing axis 16 between LED 12 and diode 14. In this position, the light from LED 12 is prevented from reaching diode 14; hence, there is no output signal on connection 20.

In operation, as paper sheet 36 moves in the direction of arrow 37, the leading edge encounters edge surface 35 of area 32 and begins to move arm 32 in a counterclockwise (CCW) direction. The movement is transmitted to all of the integral components of switch 6. Hub 22 is rotated about post 24 and the tip of arm 34 is rotated out of the position on sensing axis 16. Light from LED 12 illuminates diode 14, creating an output signal on connector 20. The signal, representing the arrival of a copy sheet, is sent to the system control and is used for timing and registration purposes. The rotational force imparted to switch 6 causes spring 28 to be extended, resulting the creation of stored energy which will return the switch to its original position when the trailing edge of sheet 36 exits the contact with edge surface 35 of arm 32. The "bounce back" phenomena is created when the spring energy is released and is a function of the way in which the bottom portion of hub 22 interfaces with the seating portion of frame 2. As shown in the exploded view in FIG. 2, two arcuate rectangular teeth like segments 40, 42, extend vertically upward from the substrate 2. The teeth are separated by 180° and by a radial arc distance D. Hub member 22 has two, arcuate teeth-like segments 22A, 22B. When hub member 22 is fully seated, the body of the hub 22 is supported by the top surfaces of segments 40, 42, and teeth 22A, 22B are seated in the spaces between teeth 40, 42. The width of teeth 22A, 22B is less than distance D, thus providing the play required during switch rotation. During the CCW rotation of switch 6, hub 22 and teeth 22A, 22B rotate within the distance D until they come to a stop against the side of teeth 40, 42, respectively. Upon release of the energy stored in spring 28, switch 6 and hub 22 are rapidly rotated in a clockwise (CW) direction. The vertical edges of teeth 22A, 22B come to a hard stop against the vertical sides of teeth 40, 42. This results in a portion of the closing return force expended by spring 28 being translated back into the hub and throughout the structure of switch 6. This sometimes results in the tip of arm 34 "bouncing back" in a CCW direction sufficient to move the arm out of sensing axis 16, thus generating an incorrect (false) output signal from diode 14.

According to the present invention, this "bounce back" phenomena is practically eliminated by changing the seating configuration of the hub member of the switch so as to reduce the effect of the return force exerted by spring 28. More particularly, the present invention relates to a rotary switch actuator comprising:

an actuator arm pivotably mounted to a substrate for movement between a reset position and a switch activated position, a hub member mounted for rotation on a pivot member fixed in position on said substrate, the improvement wherein the bottom surface of said hub member has at least two inclined surface segments which mate with inclined surfaces protruding upward from the substrate.

DESCRIPTION OF THE INVENTION

Figure 1:
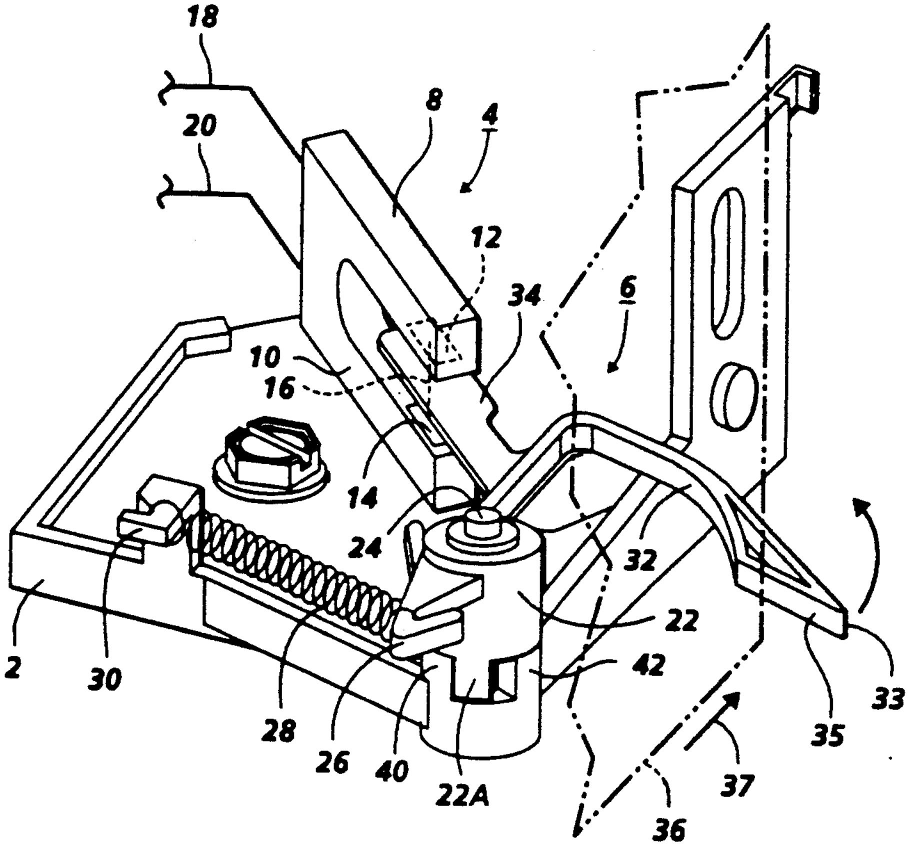
FIG. 1 PRIOR ART
FIG. 1 shows a prior art, rotary switch in a sheet transport path.
Figure 2:
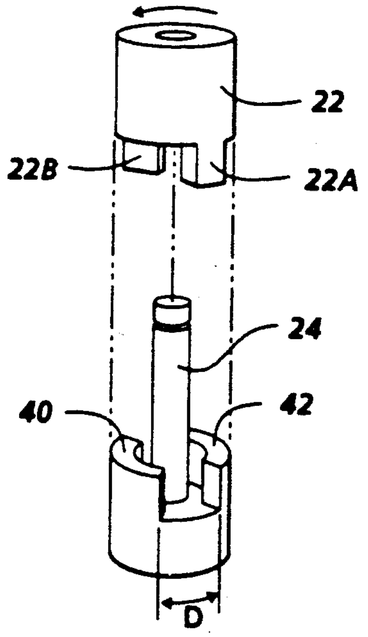
FIG. 2 PRIOR ART
FIG. 2 is an exploded view of the hub portion of the rotary switch shown in FIG. 1.
Figure 3:
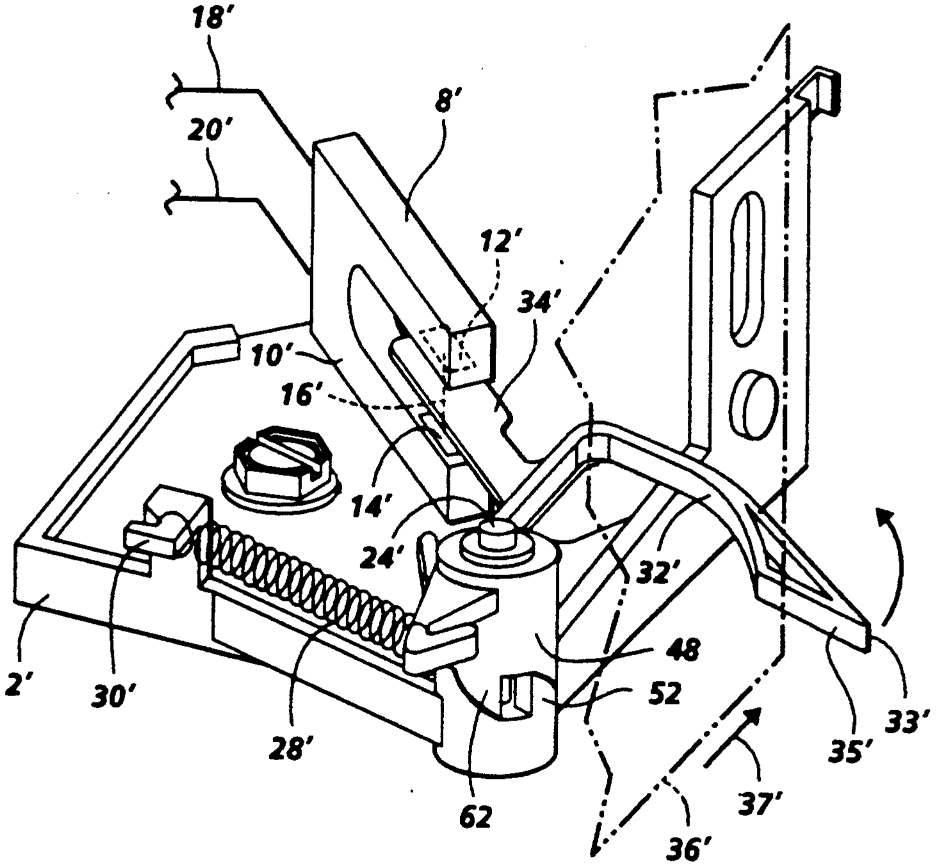
FIG. 3 shows a rotary switch of the present invention in a paper transport path.
Figure 4:
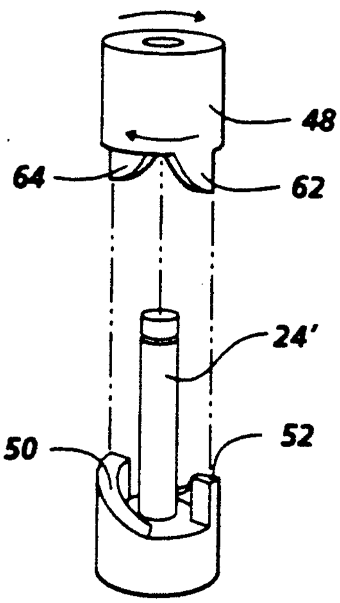
FIG. 4 shows an exploded view of the hub portion of the switch shown in FIG. 3.

Referring now to FIG. 3, there is shown an improved rotary switch actuator of the present invention. The switch construction and the base substrate elements are similar to the prior art switch of FIG. 1 and the components whose functions do not change are identified by the same call outs with a prime ('). The changes in construction are found in the lower half of the hub member and in the configuration of the mounting (seating) protrusions or teeth formed on substrate 2. The modified configuration results in elimination of the "bounce back" phenomena and is best illustrated by referring to the exploded view of the hub member 48 and seating elements 50, 52, 62, 64, shown in FIG. 4. Referring to FIGS. 3 and 4, the arcuate rectangular teeth-like member of the prior art (teeth 40, 42 of FIG. 2), which extend vertically upward from substrate 2, have been replaced by two helical-shaped teeth 50, 52 separated by 180°. The teeth are formed from a point on the substrate surface and ramp upward to form a vertical helical-shaped edge. The teeth are separated from the base of one segment to the vertical edge of the other by radial arc distance D. Hub member 48 also has two arcuate downwardly extending, helically-shaped teeths 62, 64 separated by 180°. When hub member 48 is fully seated, the body of hub member 48, or rather the bottom surface of teeth 62, 64 are supported along the top surface of teeth 50, 52.

Figure 5:
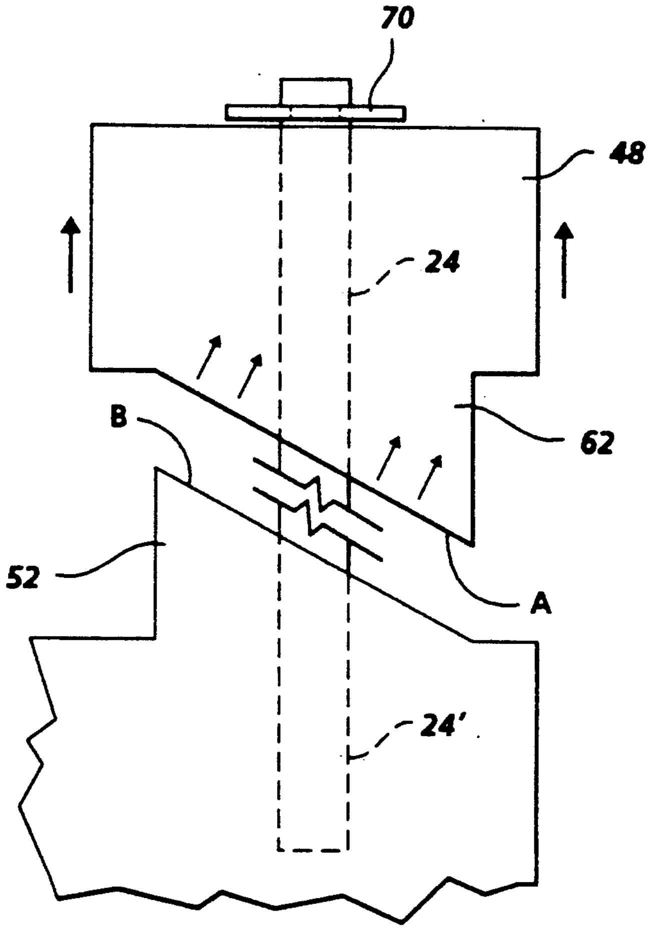
FIG. 5 shows a side view demonstrating the side view of the switch of FIGS. 3 and 4 demonstrating the bias forces operating on the hub mounting surface.

The mechanical operation of switch 6' is the same as that described for switch 6. Paper sheet 36 creates the force which rotates the switch CCW and extends spring 28 storing a return force F. As the switch rotates, hub 48 rotates, moving teeth 62, 64 away from the seated position on the surfaces of teeth 50, 52 and into spaces D. Upon passage of sheet 36, the spring energy (force F) is returned, rotating switch 6' CW. As shown in FIG. 5, the helical surfaces of teeth 62, 64 are brought into gradual contact and mate with the helical surfaces of teeth 50, 52 in such a way as to translate the spring force in a direction normal to the mating surfaces of teeth 62, 64 and 50, 52. This results in a deceleration of the CW rotation, since the sliding contact of the mating helical surfaces is in an upward and rotational motion. The rotational motion is completely stopped by providing an E ring 70 at the top of post 24. It is understood that teeth 62, 64 are translated upwards along the helical ramp surfaces mating surfaces.

It is thus apparent that this modification provides for a "soft" stop instead of the "hard" stop of the prior art devices and the actuator arm 34 does not exhibit the "bounce back" which would trigger the false signal from diode 14'.

Other modifications of the present invention may occur to those skilled in the art based upon a reading of the present disclosure and these modifications are intended to be included within the scope of the present invention.

We claim:

1. A rotary switch actuator comprising:

an actuator arm pivotably mounted to a substrate for movement between a reset position and a switch activated position, a hub member mounted for rotation on a pivot member fixed in position on said substrate, the improvement wherein the bottom surface of said hub member has at least two inclined surface segments which mate with inclined surfaces protruding upward from the substrate.

2. The switch of claim 1 wherein the bottom surface of said hub member includes two teeth having a helical surface and said two surface segments having a complimentary helical surface and further including a spring means for storing a force F when said actuator arm is moved to a switch activated position and releasing said energy force in a direction substantially normal to said helical surfaces.

3. A rotary switch actuator comprising:

an actuator arm pivotably mounted to a substrate for movement between a reset position and a switch activated position, a hub member mounted for rotation on a pivot member fixed in position on said substrate, the improvement wherein the bottom surface of said hub member has at least two inclined surface segments which mate with inclined surfaces protruding upward from the substrate and further including spring means connected between said hub member and a fixed point on said substrate and lying in a plane parallel to the substrate, said spring means storing a force F when said actuator arm is moved to a switch activation position and releasing said force F in a direction generally parallel to the plane in which the spring is fixed when the switch returns to a non-actuated position.

4. A rotary switch actuator adjacent to a sheet transport path, said switch including a substrate, a horseshoe sensor having an upper arm including a light source and a lower arm incorporating a light sensor, said light source and light sensor having a common sensing axis, a first actuator arm extending into said transport path, a second actuator arm extending into said common sensing axis, a hub assembly mounted for rotation about a pivot post fixed in position on said substrate, said hub assembly having a plurality of helical segments which mate with helical segments formed on said substrate, a spring member connected between said hub member and said substrate, and wherein upon rotation of said switch by a paper sheet contacting said first arm, said second arm is moved out of the common sensing axis and generates a detected paper signal and said spring is stretched to create an energy force and upon movement of the paper sheet out of contact with the first activator arm, said switch is rotated to the first position by the action of the stored energy of said spring and wherein said helical surfaces slide upward to release the stored energy of the spring so that the second arm does not bounce back out of the common sensed axis.

* * * * *